United States Patent Office 2,727,537
Patented Dec. 20, 1955

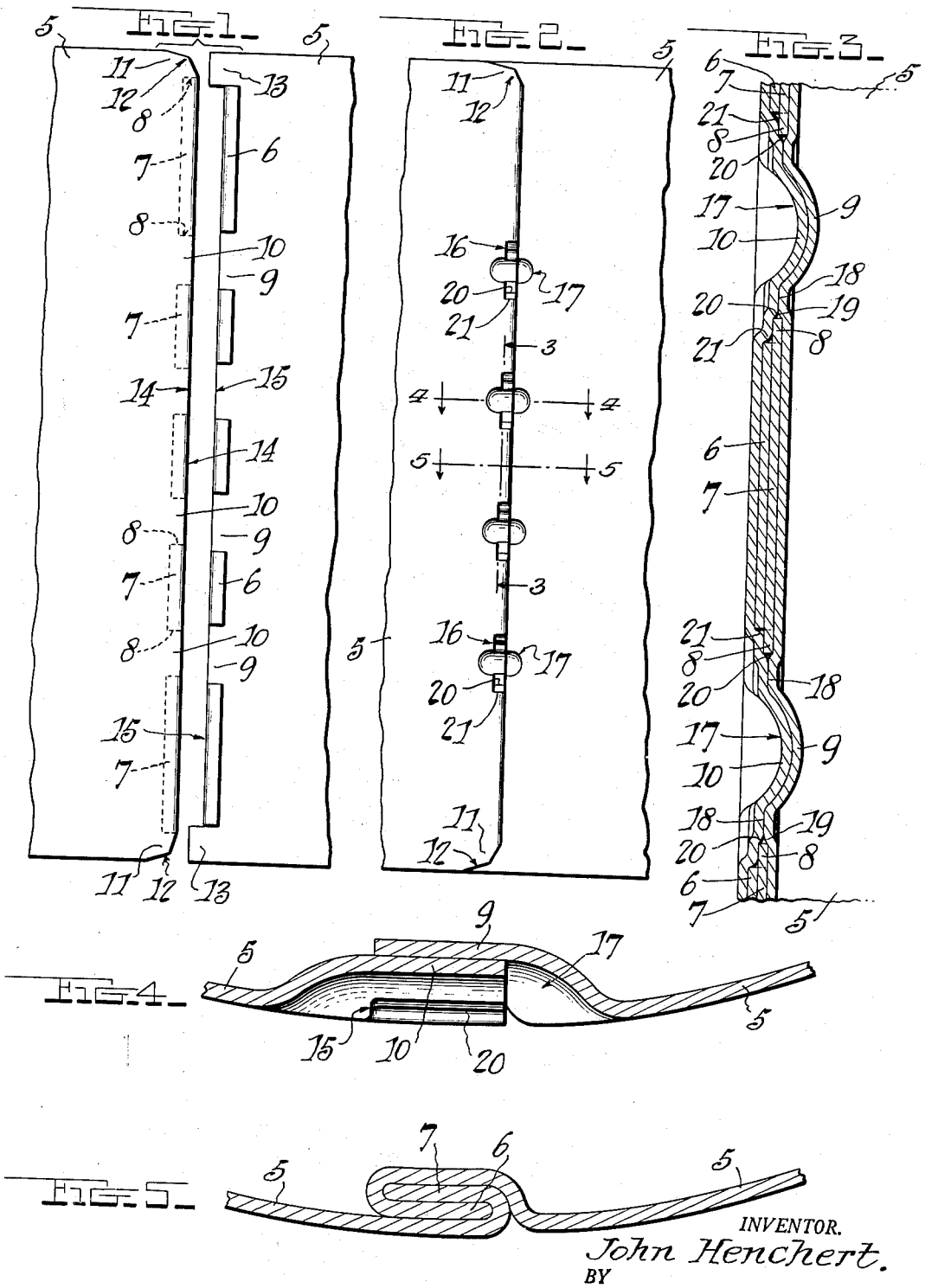

2,727,537

SIDE SEAM WITH ALTERNATED LOCK AND LAP PORTIONS AND INDENTS IN LAP PORTIONS

John Henchert, River Forest, Ill., assignor to Continental Can Company, Inc., New York, N. Y., a corporation of New York Application February 27, 1952, Serial No. 273,624

3 Claims. (Cl. 138—74)

The invention relates to new and useful improvements in metal can bodies, and more particularly to the construction of the side seam for uniting the edge portions of a blank to form the can body.

It is quite common in the making of can bodies to join the edge portions of a blank in the form of a lock and lap side seam. The end portions of the blank are lapped to facilitate the flanging of the body preparatory to the securing of end members thereto by the conventional double seaming operation, and the side seam between the lapping portions at the ends is formed of interengaging hooks. The interengaging hooks and the lapping portions at the ends of the side seam are united by a solder bond. Difficulty has been experienced at times in preventing shifting of the seam components relatively, in radial or longitudinal directions, while the can bodies are being conveyed to the solder bonding station, and difficulty also has been experienced in the flowing of the solder by capillary attraction throughout the entire region of the interengaging hooks. Also, it has been found that internal pressure in filled cans sometimes causes the hooks to swing apart and rupture the solder bond. Therefore, it is an object of the present invention to provide a novel seam structure and a novel method of forming the same which will avoid all of the difficulties referred to.

In its more detailed nature, the invention resides in providing a side seam structure of the character stated wherein are included an alternated series of lock and lap portions and indents in the lap portions bringing opposing lap faces into intimate contact with each other between and against the ends of intervening hook end portions.

Another object of the invention is to provide a seam structure of the character stated wherein the indents formed in the lap portions are cruciform in shape, each being composed of a longitudinal indent extending along the seam, and a transverse indent extending across the seam and intersecting the longitudinal indent.

Another object of the invention is to provide a seam structure of the character stated wherein the indents are made from opposite faces of the seam so as to bring opposing lap portions in face to face contact intermediately of the thickness of the interlocked hook portions.

Another object of the invention is to provide a seam structure of the character stated wherein the indents are made from opposite faces of the seam so as to bring opposing lap portions in face to face contact intermediately of the thickness of the inner wall of the outer hooks.

Another object of the invention is to provide a seam structure of the character stated wherein each inner hook is shorter than and centered opposite the outer hook with which it interengages, thereby to provide an outer hook wall end extension beyond each end of each inner hook, and the longitudinal indents are so formed as to provide an interlocking shoulder engaging over an end of each of the inner and outer hooks.

Another object of the invention is to provide a seam structure of the character stated wherein each inner hook is shorter than and centered opposite the outer hook with which it interengages, thereby to provide an outer hook wall end extension, and the longitudinal indents are so formed as to cause both walls of each lap portion to provide an interlocking shoulder over an end of the inner wall of the outer hook, and one wall of each said lap portion to also provide an interlocking shoulder over an end of the outer wall of the inner hook.

Another object of the invention is to provide a novel method of forming a solder bonded side seam of the character stated which comprises first forming the blank with the alternated lock and lap portions as aforesaid, then bringing the hooks together to shape the body, then indenting the lap portions intermediately of the hook portions, and then solder bonding the thus formed side seam.

Another object of the invention is to provide a novel method of the character stated wherein the indents are cruciform in shape and have their longitudinal and transverse intersecting portions simultaneously formed.

With the above and other objects in view that will hereinafter appear, the nature of the invention will be more fully understood by following the detailed description, the appended claims, and the several views illustrated in the accompanying drawings.

In the drawings:

Figure 1 is a face view illustrating the blank with the hooks formed thereon and about to be brought into interengaging contact.

Figure 2 is a face view illustrating the completed side seam.

Figure 3 is an enlarged fragmentary longitudinal section taken on the line 3—3 on Figure 2.

Figures 4 and 5 are enlarged fragmentary cross sections taken on the lines 4—4 and 5—5 respectively of Figure 2.

In the practical development of the invention the body blank is formed in the manner illustrated in Figure 1 with inside and outside hook portions interrupted at intervals by intervening lap portions, the hook and lap portions being so formed that each inside hook will be shorter than, and centered opposite, a cooperating outer hook, and the intervening lap portions overlap only to the extent of the width of the seam. The only lap portions which will extend widthwise beyond the seam width are the inner end laps at the extreme ends of the seam which are to be turned outwardly into a flange in the conventional manner.

The body blank is designated 5, the inner hooks are indicated at 6 and the outer hooks at 7. By making the inner hooks 6 shorter and centering them with relation to the cooperating outer hooks 7, each said outer hook will extend at each end beyond the cooperating inner hook as at 8. Between each two adjacent inner hooks 6 there is provided an inner lap portion 9, and between each two adjacent outer hooks 7 there is provided an outer lap portion 10. It will be apparent by reference to Figures 1 and 4 that the lap portions 9 and 10 will overlap only to the extent of the width of the seam structure. Endwise of each endmost outer hook 7 there is provided a lap portion 11, angle cut at 12 in the usual manner, and it will be noted by reference to Figures 1 and 2 that no portion of these laps 11 extends inwardly beyond the seam line formed by the folds of the long outer hooks 7 and the raw metal end edges of the intermediate outer lap portions. Endwise of each endmost inner hook 6 there is provided a lap portion 13, and these are the only lap portions which extend widthwise beyond the width of the seam formed by the interlocking of the hooks, as will be apparent by reference to Figure 1. The formation of the lap portions 11 and 13 is conventional and they form a two thickness overlap at the extreme ends of the formed can body whereon the usual outwardly turned flanges are to be formed in the manner well known to workers in the art.

After the formation of the body blank as previously described, and the bending of the hooks into the positions shown in Figure 1 so as to present substantially continuous edges along the opposing outer and inner or meeting ends of the blank, as shown at 14 and 15, the hook portions 6 and 7 are brought together in the usual manner, as indicated in Figure 5 to shape the can body, and the side seam thus partially formed is bumped to shape or condition the same in the novel manner illustrated in Figures 2 through 5. The bumped side seam is thereafter solder bonded in the usual manner.

It will be apparent from the foregoing, and by reference to Figures 3, 4 and 5 that at each extreme end of the seam a two thickness area will be provided by the overlapping of the laps 13 and 11, at each interlocked hook portion a four thickness area will be provided by the hooks 6 and 7 and the body wall portions from which they extend, and at each portion of the seam where a long hook 7 projects at 8 endwise beyond the cooperating shorter or inner hook 6, a three thickness area will be provided.

It is to be understood that the spline and bumper steel used in the bumping and shaping of the seam are so shaped as to bring about the shaping of the seam shown in Figures 2, 3 and 4 in a single bumping operation, preferably, but not necessarily, before the solder bonding step. It is highly desirable that the bumping step shall precede the solder bonding step because a better solder bond will result, the seam will be held firmly against relative displacement of the interlocked hook portions both lengthwise and widthwise while the body is being moved to the solder bonding station, and the seam will not be disturbed or ruptured after the bonding thereof, as might be the case were the bumping performed after the solder bonding.

In the bumping and shaping of the seam somewhat cruciform indents or depressions are formed therein, each being centered on one of the intermediate lap portions and comprising a longitudinal stepped portion 16 extending along and confined within the width of the seam hooks and being traversed or intersected by a transverse or circumferential portion 17. It will be noted by reference to Figure 3 that in this bumping of the side seam the opposing laps 9 and 10 are indented from opposite faces so as to be brought into intimate two wall, capillary action facilitating face contact as at 18 between the interlocked hooks 6 and 7 in each instance inwardly of and centrally of the thickness of the respective long hook end extension 8. In other words, each outer lap 10 is depressed inwardly, and each inner lap 9 is depressed outwardly, said laps meeing in two wall, capillary action facilitating face to face contact and against the end of each outer hook end extension 8. This forms an abutting shoulder 19 on each inner lap 9 engaging each respective long or outer hook end extension 8 at the inner face of the seam, and at the outer face of the seam each longitudinal indent is of such length as to form an abutting shoulder 20 on each outer lap 10 engaging each respective long or outer hook end extension 8 and a second abutting shoulder 21 engaging the adjacent end of each respective inner or short hook 6. It will be apparent also that the opposed faces of the laps 9 and 10 are in intimate contact throughout the length thereof in the transverse indents 17. See Figures 3 and 4.

Each of the inner or short hooks 6 and each of the outer or long hooks 7 includes radially spaced, parallel body and hook wall portions, as will be apparent by reference to Figures 1 and 5. In the formation of the longitudinal indents in the manner described in the preceding paragraph said indents are stepped at the outer wall portion and both opposing walls of each lap portion indent are caused by said stepped arrangement and the indents at the inner face of the lap portion to engage in close shoulder abutment at 19, 20 with the ends of the hook wall portions of the adjacent outer hooks 7, or in other words their end extensions 8, and one wall of each said lap portion is similarly caused by the stepped indent arrangement to engage in close shoulder abutment at 21 with an end of each of the hook wall portions of the adjacent inner hooks 6, as clearly illustrated in Figure 3. The transverse indents 17 are formed in the walls of the respective lap portions and extend across the respective longitudinal indents therein and a short distance beyond the seam line at each side thereof, as will be apparent by reference to Figures 2 and 4. These transverse indents are deeper than the longitudinal indents and are effective to stretch the metal of the can body in the side seam area so that the inner and outer lap portion walls will be drawn into and held in intimate contact preparatory to soldering the side seam, and these indents also serve to recess the exposed edge of the outer wall of each lap portion so that it cannot be readily engaged by a solder wiper roll during such a soldering operation.

By reason of forming the side seam in the manner described, not only do the alternated lock and lap portions and the cruciform indents serve to hold the seam in perfect relation against any tendency on the part of the blank ends to shift relatively in radial or longitudinal directions while a given body is being moved to the soldering station, but a better solder bond also is assured, even though a lesser amount of solder is used than in the more conventional forms of seams because of the intimate face to face contact and close spacing of the seam components in the manner previously described. Outward swinging of outer hooks and resulting solder bond rupturing is avoided, and outward swinging of lap portions such as would present end edges in position for having the tin wiped therefrom in a manner for exposing bare metal to future rusting action also is avoided.

While an example form of the improved side seam structure is shown and described herein, as well as example method steps which preferably are performed in the fabrication of the seam, it is to be understood that variations in said seam structure and method steps may be made without departing from the spirit and scope of the invention as defined in the appended claims.

I claim:

1. A metal can body including edge portions joined in a side seam extending longitudinally of the body and comprising a plurality of longitudinally spaced lock portions and a plurality of lap portions each disposed between an adjacent pair of the longitudinally spaced lock portions, each said lap portion comprising opposing inner and outer walls, each said lock portion being composed of inter-locked inner and outer hooks with each hook including radially spaced parallel body and hook wall portions and each said hook wall portion having end terminals bearing perpendicular relation to the length of the hooks and each inner hook wall portion being shorter than and centered longitudinally opposite the outer hook wall portion with which it engages, thereby to provide an outer hook wall extension longitudinally beyond each end of each inner hook wall portion, and longitudinal stepped indents disposed in said lap portions and extending therealong in line with the lock portions the opposing inner and outer lap walls being in intimate contact with each other between the inter-locked inner and outer hook wall portions and the stepped indent steps being in close shouldered abutment against the perpendicular ends of the intervening hook wall portions.

2. Can body structure as defined in claim 1 wherein the longitudinal stepped indents are presented at the outer faces and other indents are presented at the inner faces at each lap portion and opposing lap faces in each said lap portion intimately contact with each other intermediately of the ends of the hook wall portions of the adjacent outer hooks so that both opposing walls of each lap portion present indent steps engaging in close shoulder abutment over an end of each of the hook wall portions of the adjacent outer hooks, and one wall of each said lap portion presents indent steps also engaging in close shoulder abutment over an end of each of the hook wall portions of the adjacent inner hooks.

3. Can body structure as defined in claim 1 wherein the longitudinal stepped indents are presented at the outer faces and other indents are presented at the inner faces at each lap portion and opposing lap faces in each said lap portion intimately contact with each other intermediately of the ends of the hook wall portions of the adjacent outer hooks so that both opposing walls of each lap portion present indent steps engaging in close shoulder abutment over an end of each of the hook wall portions of the adjacent outer hooks, and one wall of each said lap portion presents indent steps also engaging in close shoulder abutment over an end of each of the hook wall portions of the adjacent inner hooks, and there also being included a transverse indent formed in the walls of each lap portion and extending across the respective longitudinal indent therein and a short distance beyond the seam line at each side thereof, each said transverse indent being indented toward the interior of the can body and deeper than the longitudinal indent traversed thereby.

References Cited in the file of this patent

UNITED STATES PATENTS

| | | |
|---|---|---|
| 1,685,384 | Young | Sept. 25, 1928 |
| 1,729,195 | Warren | Sept. 24, 1929 |
| 2,064,537 | Groenke | Dec. 15, 1936 |
| 2,093,056 | Plumb | Sept. 14, 1937 |
| 2,106,656 | Punte | Jan. 25, 1938 |
| 2,259,498 | Taylor | Oct. 21, 1941 |
| 2,350,824 | Rojo | June 6, 1944 |